Patented June 17, 1930

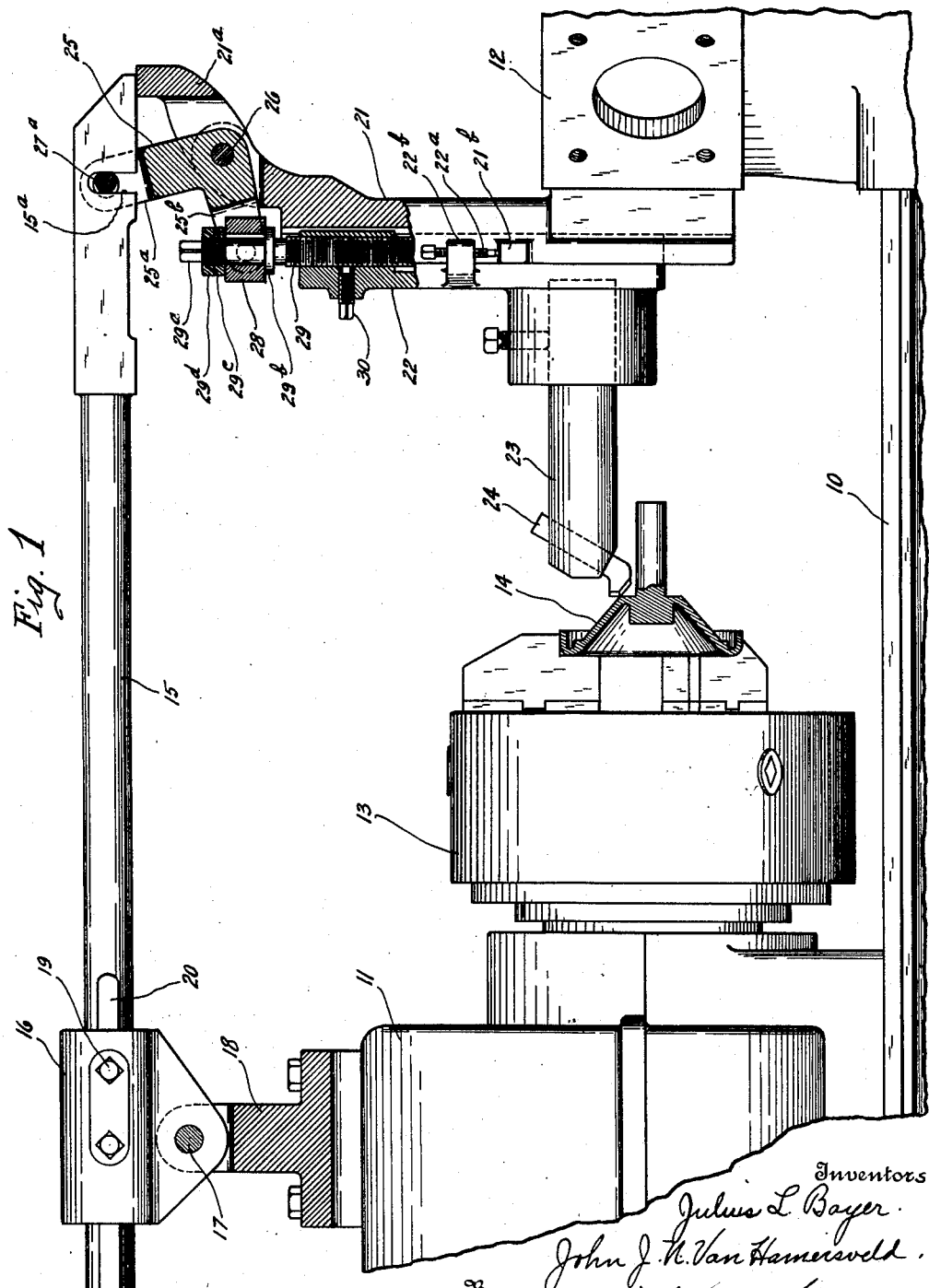

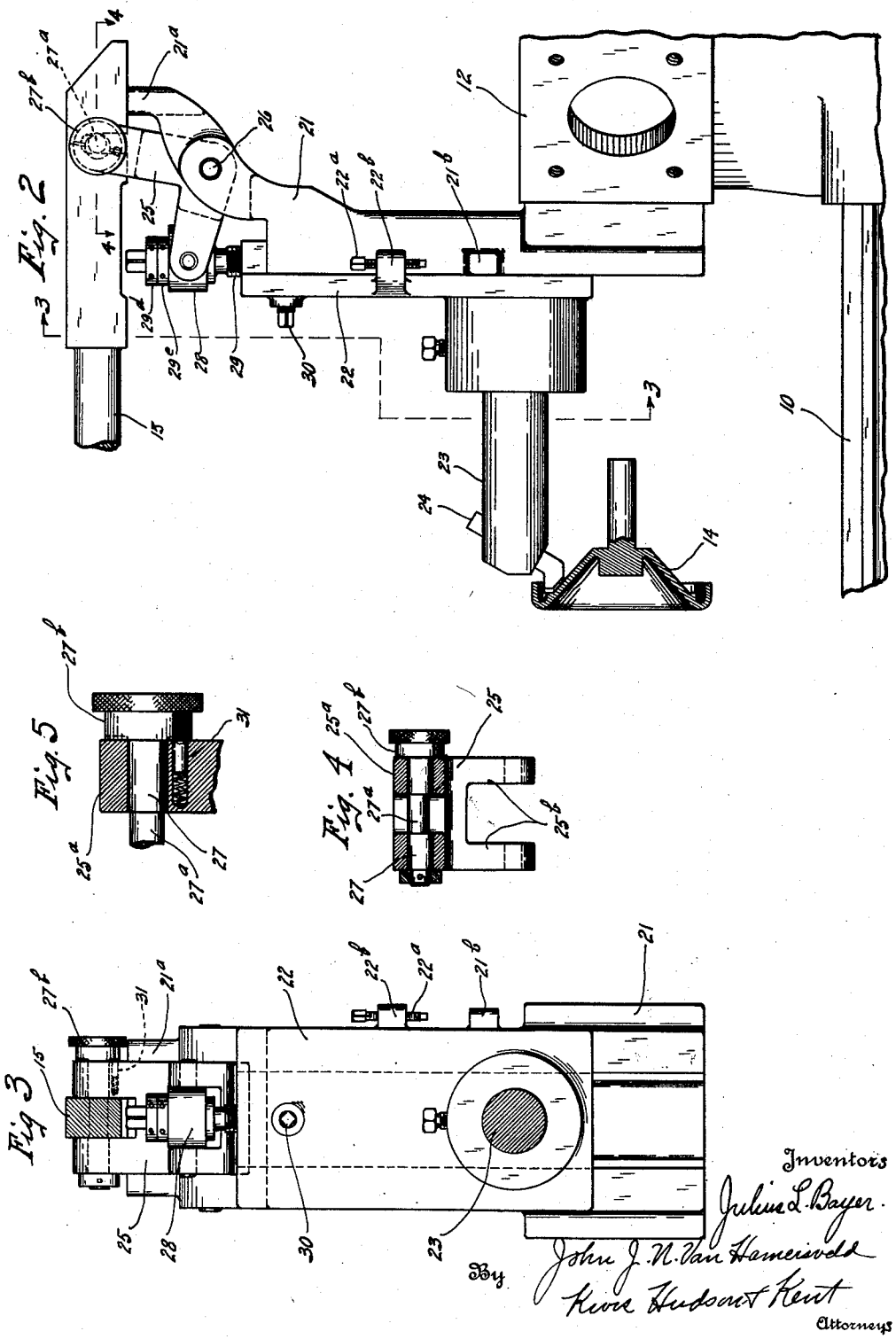

1,763,745

UNITED STATES PATENT OFFICE

JULIUS L. BAYER, OF CLEVELAND, AND JOHN J. N. VAN HAMERSVELD, OF CLEVELAND HEIGHTS, OHIO, ASSIGNORS TO THE WARNER & SWASEY COMPANY, OF CLEVELAND, OHIO, A CORPORATION OF OHIO

TAPER TURNING OR BORING MECHANISM FOR MACHINE TOOLS

Application filed January 7, 1928. Serial No. 245,220.

This invention relates to a turning and boring attachment for machine tools and has for its chief object to provide an attachment by which surfaces can be turned or bored on a much steeper angle than is permitted by prior attachments such as those which are operated on the principle of a cam and follower.

With taper turning and boring attachments of the cam and follower type, the cam is usually carried by a bar supported in fixed position from a suitable part of the machine, such as the head, and the tool carrying part of the attachment includes a slide which, as the main slide moves toward the head, is adapted to be moved vertically by means of a follower which engages the cam. An attachment operating on this principle is limited in its field of use in so far as the angle of the tapered surface is concerned for when the taper exceeds a certain angle the lateral component of the pressure exerted by the cam on the follower becomes so great that the attachment does not function properly and accurate results are not obtainable.

In accordance with the present invention, we provide between a stationary member, which may be in the form of a bar, and the vertically or laterally movable tool slide a member which positively connects these parts so that as the main slide moves toward the head there is imparted to the tool slide a lateral motion such that the relation between the horizontal travel of the slide and the lateral movement imparted by this member is fixed, thereby causing the tool to cut on a straight taper, as distinguished from a spherical taper. In the preferred embodiment, this positive connecting member is in the form of a bell crank one arm of which is connected to the said stationary member and the other of which is connected to the tool slide, the fixed ratio between the horizontal and lateral movements being obtained by the proper form of connection between the arms of the bell crank and the stationary member and slide respectively.

Additional features of novelty reside in the means for retracting the tool from the work on the completion of the cut and in the adjustment of the slide relative to the other parts.

The invention may be further briefly summarized as consisting in certain novel combinations and arrangements of parts and details of construction which will be described in the specification and set forth in the appended claims.

In the accompanying sheets of drawings, Fig. 1 is a view partly in side elevation and partly in section, showing the main parts of a lathe to which the attachment is applied, this view showing the position of the tool at the beginning of the cut; Fig. 2 is a similar view of a portion of the machine showing the relative positions of the parts with the tool at the end of the cut; Fig. 3 is a sectional view substantially along the irregular line 3—3 of Fig. 2; Fig. 4 is a detail sectional view substantially along the line 4—4 of Fig. 2; and Fig. 5 is a fragmentary view of the upper portion of the bell crank on a slightly enlarged scale.

Our invention has special utility when employed as an attachment for machine tools, such as lathes and the like, and for that reason we have illustrated our invention in the form of an attachment but it may be built into a machine used solely for the purpose of turning or boring tapered surfaces. Furthermore, we have illustrated the invention for turning an external tapered surface but it will be obvious that it may be employed for boring an internal tapered surface by the proper positioning of the tool slide and mounting of the cutting tool.

Referring now to the drawings, the machine tool herein illustrated is in the form of a lathe having a bed 10, a head 11, and a turret slide 12. The head is provided with the usual spindle, not shown, carrying a suitable chuck 13 which may be of any usual construction and which supports a work piece herein designated 14. In this instance, the attachment is composed of parts supported on the head 11 and turret 12, the part which is supported on the head consisting of a stationary member in the form of a bar 15 which, when the attachment is in use, extends horizontally forward from the head, as illustrated in Fig. 1. In this instance, the bar 15 is adjustably supported in a holder 16 which in turn is pivotally connected by a pin 17 to a bracket 18 attached to the top of the head. By pivoting the holder to the bracket, the arm can be swung upward to a substantially vertical position so as to be out of the way in the event that other tools which do not require the service of the bar may be brought into use, which tools may, if desired, be mounted upon faces of the turret 12. The adjustment between the bar 15 and the holder 16 enables the bar to be moved forwardly or rearwardly, depending upon the length of the work piece or the distance of the start of the tapered surface to be cut from the face of the chuck. In this instance, the bar is slidably received in the holder 16 and can be secured in any position of adjustment by set-screws 19 adapted to engage a flattened surface 20 of the bar.

That part of the attachment which is carried by the turret 12 includes an upstanding bracket 21 which can be secured to a face of the turret by screws or otherwise. On the front face of this slide there is arranged a vertically movable tool carrying slide 22 which has a dovetail connection with the bracket 21. This slide 22 supports the tool and in this instance it is provided with a boss to which is secured a bar 23 to the end of which the tool 24 may be secured in any suitable manner.

To attain the desired results, i. e., to impart a vertical or lateral movement to the slide 22 as the turret slide moves toward the chuck with the relation or ratio between the forward movement and the vertical movement fixed, a positive connecting member, in this instance in the form of a bell crank 25, is provided between the slide 22 and the bar 15 whose position remains fixed during the normal functioning of the attachment. This bell crank is pivoted by means of a pin 26 on an upward and rearward extension 21$^a$ of the bracket 21, and this portion of the bracket is cut away so as to give the desired clearance for the rocking movement of the bell crank throughout its range, illustrated in Figs. 1 and 2. This bell crank has one of its arms 25$^a$ connected to the bar 15, the free end of this arm being forked and straddling the bar, as clearly illustrated in Figs. 1 and 3. The connection between the forked end of this arm 25$^a$ and the bar 15 is in the form of a special bearing pin 27 mounted in the fork of the arm and having an intermediate eccentric portion 27$^a$ which engages in a vertically disposed slot 15$^a$ near the forward end of the bar. The purpose of this special bearing pin 27 will be described presently. Forwardly of this slot the bar is adapted to engage on the upper surface of the extension 21$^a$ of the bracket, as illustrated in Figs. 1 and 2. Practice has demonstrated that with the construction illustrated gravity will hold the bar down on the upper surface of the extension of the bracket during the cutting operation, but if gravity will not suffice, the bar may be held down positively as by having the bar enter a hole or slot of the bracket.

The bell crank 25 has a second arm 25$^b$ which is at substantially right angles to the arm 25$^a$ and the free end of this arm is forked and connected to the tool carrying slide 22. In this instance the forked end of the arm 25$^b$ straddles and has a pivotal connection with a collar 28 mounted upon the upper portion of a vertical screw 29, which extends down into and has threaded engagement with the tool carrying slide 22. The upper end 29$^a$ of the screw 29 is shaped to accommodate a wrench, and when the screw is turned the slide 22 is moved vertically to adjust it with reference to the bell crank and thereby adapt the attachment for work pieces of different diameters. After the screw is adjusted, it may be clamped in position by a set-screw 30. Between the inner end of the set-screw and the threads of the screw 29 a piece of relatively soft metal may be positioned to prevent injury to the threads, as is customary. The collar 28 is arranged between two abutments of the screw, one being in the form of a shoulder 29$^b$ and the other in the form of a nut 29$^c$ which may be accompanied by a lock nut 29$^d$, the nuts being on a threaded part of a screw directly beneath the wrench portion 29$^a$. Between the abutments 29$^b$ and 29$^c$ the screw has a smooth, unthreaded portion which extends through the collar 28, and this portion of the screw is somewhat smaller in diameter than the bore in the collar, thereby providing a clearance which will enable the collar to have a slight sliding motion between the abutments as the bell crank is rocked in the functioning of the attachment, thus allowing the screw to have a true vertical movement when the arm 25$^b$ of the bell crank is being rocked. This mode of connection between the arm 25$^b$ and the screw is the equivalent of the connection between the upper arm 25$^a$ and the bar, i. e., it is the equivalent of a pin and slot connection by which the other arm of the bell crank is connected to the bar 15.

It is obvious from the above that when the turret slide moves forward toward the head, the stationary horizontal bar 15 will cause the bell crank 25 to be rocked, the pin and slot connection between the upper arm 25$^a$ of the bell crank and the bar allowing the bell crank to be rocked from the position shown in Fig. 1 to that shown in Fig. 2 without disturbing the horizontal position of the bar. While the turret slide is moving forwardly and the bell crank 25 is being rocked, the vertical component of the rocking movement of the arm 25$^b$ is imparted to the screw 29 and therefore to the tool holding slide 22, the clearance between the collar 28 and the portion of the screw which the collar surrounds preventing a lateral thrust on the screw and causing the screw to have a vertical movement only. By this arrangement of parts, the relation between the forward movement of the tool carrying slide 22 and the vertical movement of this slide is fixed between the two limits of movement of the bell crank with the result that between said limits of movement of the bell crank the tool 24 will impart a straight tapered surface to the work piece 14.

If the arms 25$^a$ and 25$^b$ of the bell crank are of equal length, as herein illustrated, the work piece will be turned or bored, as the case may be, on a 45° taper. If the arms of the bell crank are of unequal lengths, the taper will be greater or less than 45°, depending upon which arm of the bell crank has the greater length. For example, if the arm 25$^a$ is shorter than the arm 25$^b$ (the length of the slot 15$^a$ will permit of variation in the length of this arm), the angle of the taper will be greater than 45°. The attachment admits of bell cranks having equal or unequal lengths of arms, and this phase of the invention may be taken care of either by the use of a bell crank, the relative lengths of the arms of which may be varied, or by the use of different bell cranks, the relative lengths of the arms of which are different.

On the completion of the cut, i. e., when the tool reaches the position shown in Fig. 2, the tool is preferably retracted from the work piece so as to prevent the tapered surface being scored by the tool as the turret slide is retracted. This relieving of the tool from the work piece is accomplished very readily with the present improvement by the provision of the special bearing pin 27 with its eccentric middle portion 27$^a$, for it is only necessary to turn the pin 27 through 180° to reverse the position of the eccentric portion 27$^a$, and in so doing the bell crank is rocked slightly so as to elevate the arm 25$^b$ and thus move the tool clear of the work piece, see Figs. 1 and 4. The bearing pin is preferably held in either of its two positions by a suitable automatic latch which, in this case, consists of a spring-pressed plunger 31 adapted to engage notches disposed 180° apart on the inner face of an enlarged head 27$^b$ of the pin which head is preferably knurled so it can be turned readily.

We prefer to provide a positive stop to limit the downward movement of the tool carrying slide 22 when the turret slide is retracted by hand or otherwise to its normal rearward position. This consists in this instance of a lug 21$^b$ provided on the bracket 21 and an adjustable set-screw 22$^a$ which is carried by a lug 22$^b$ on the tool carrying slide 22, which set-screw is adapted to engage the lug 21$^b$ when the slide 22 is in its lowermost position. When the turret slide has been retracted as just stated and the set-screw engages the lug 22$^b$, the operator may, if he so desires, swing the bar 15 upward to its inoperative position, and in that event the tool slide is securely supported, after which the turret slide may be moved further rearward for loading purposes or the turret may be indexed to bring other tools to operative position.

We have already pointed out the fact that our invention may be embodied not only as an attachment but also in a machine adapted for turning or boring tapered surfaces only. Whether the invention is in the form of an attachment for a machine tool or otherwise, it is, of course, not necessary that the bracket or equivalent member carrying the slide 22 be attached to a main slide in the form of a turret slide. Furthermore, it will be obvious that the main slide, whether or not it is in the form of a turret slide, may be moved forward or retracted manually or by power. There are many advantages in applying our attachment to the turret of a turret slide, among which may be mentioned the fact that that part of the attachment which is carried by the turret 12 may be duplicated and one unit may be employed for roughing purposes and the other for finishing purposes, both units cooperating with the same bar 15.

While we have shown the preferred embodiment of the invention, we do not desire to be confined to the precise details or arrangements shown but aim in our claims to cover all modifications which do not involve a departure from the spirit and scope of the invention as set forth in the appended claims. For example, we do not regard it as essential that the tool slide move vertically or laterally at strictly right angles to the axis of the machine, nor do we desire to limit ourselves to a tool carrying member (in this instance the member 22) which is in the form of a slide.

Having thus described our invention, we claim:

1. The combination with a machine tool having relatively movable work and tool holding members, of means for turning or boring a tapered surface comprising an abutment adapted to be supported by the machine, a tool support mounted on said tool holding member for movement thereon at right angles to the axis of the machine, and a positive movement transmitting connecting member between the abutment and the tool support for imparting to said support a lateral movement having a fixed relation to the relative movement of the tool and work holding members during the cutting operation.

2. The combination with a machine tool having work and tool holding members, of means for turning or boring tapered surfaces comprising a normally stationary abutment supported by the work holding member, and a unit supported by the tool holding member and comprising a tool support movable laterally of the axis of the machine, and a positive movement transmitting connecting member connected to both the abutment and the tool support to impart a lateral movement to the tool so that the ratio between the lateral movement and the relative axial movement between the tool and work holding members is fixed.

3. In combination with a machine tool having relatively movable work and tool holding members, a normally stationary abutment, a tool support mounted on the tool carrying member for movement laterally of the axis of the machine, and a bell crank between the abutment and said tool support and connected to both of them.

4. In combination with a machine tool having work and tool holding members, means for turning or boring tapered surfaces comprising a substantially horizontal, normally stationary bar, and a laterally movable tool support carried by said tool holding member and having a bell crank connection with said bar.

5. The combination of a machine tool having relatively movable work and tool holding members, a normally stationary abutment, a tool support carried by said tool holding member mounted for movement laterally of the axis of the machine, and a bell crank between said abutment and the tool support, one arm of the bell crank having a connection with the latter effective for both forward and reverse movements so as to impart thereto one component only of its rocking movement.

6. In a machine tool having relatively movable work and tool holding members, means for turning or boring a tapered surface comprising a normally stationary abutment, a tool support carried by the tool holding member for movement laterally of the axis of the machine, and a bell crank having one arm adapted to be connected with the abutment and having a second arm connected with the tool support, one of the connections comprising a member which may be shifted to relieve the tool from the work piece.

7. In a metal working machine having relatively movable work and tool holding members, a normally stationary abutment, a tool support carried by the tool holding member and movable laterally of the axis of the machine, a connection between said abutment and tool support including a bell crank pivotally supported and having an arm adapted to be connected to one of said parts, and an adjustable member connected to the other of said parts and connected with the other arm of the bell crank.

8. In a metal working machine having relatively movable work and tool holding members, means for turning or boring a tapered surface comprising a normally stationary abutment, a tool support carried by the tool holding member and movable toward and from the axis of the machine, an adjustable screw carried by said support, and a bell crank connection between the abutment and said screw.

9. A taper turning or boring attachment for machine tools comprising a normally stationary abutment adapted to be applied to a suitable part of the machine tool, and a unit adapted to be applied to the tool holding member of the machine tool comprising a bracket, a tool carrying slide carried thereby, and a bell crank adapted to engage said abutment and having a positive connection with said slide.

10. A taper turning or boring attachment for machine tools comprising a normally stationary abutment adapted to be applied to a suitable part of the machine tool, and a unit adapted to be applied to the tool holding member of the machine tool comprising a bracket, a tool carrying slide carried thereby, a bell crank having one arm adapted to be connected with said slide, and a bearing pin having an eccentric portion connecting the other arm of the bell crank to the abutment.

11. A taper turning or boring attachment for machine tools comprising a normally stationary abutment adapted to be applied to a suitable part of the machine tool, and a unit adapted to be applied to the tool holding member of the machine tool comprising a bracket, a tool carrying slide carried thereby, a member adjustably connected with the slide, and a bell crank having an arm adapted to engage the abutment and a second arm pivotally connected with said adjustable member on the slide.

12. A taper turning or boring attachment for machine tools comprising an arm adapted to be applied in a normally stationary position to a suitable portion of the machine, a unit adapted to be applied to a tool carrying slide of the machine tool and comprising a bracket, a slide carried by said bracket for movement toward and from the axis of the machine, a screw extending lengthwise of the slide and adjustable therein, a bell crank supported by the bracket and having two arms one adapted to engage the abutment and the other pivotally and loosely connected with said screw.

13. The combination with a machine tool having relatively movable work and tool holding members, of a taper turning or boring attachment comprising a normally stationary member, a tool support carried by the tool holding member and movable laterally of the axis of the machine, and a pivoted bell crank connecting the said stationary member with the tool support and having one arm connected with the former and the other arm adjustably connected with the tool support.

14. The combination with a machine tool having relatively movable work and tool holding members, of a normally stationary abutment, a tool support carried by the tool holding member and movable laterally with respect to the axis of the machine, and a member forming a positive connection between the abutment and the tool support and imparting to the latter a lateral movement having a fixed relation with respect to the axial relative movement between the work and tool holding members, said abutment being adjustable axially of the machine to adapt it for work pieces of different lengths.

15. The combination with a machine tool having relatively movable work and tool holding members, of a normally stationary abutment, a tool support carried by the tool holding member and movable laterally with respect to the axis of the machine, and a member forming a positive connection between the abutment and the tool support and imparting to the latter a lateral movement having a fixed relation with respect to the axial relative movement between the work and tool holding members, said abutment extending longitudinally of the machine and being pivotally supported so that it may be swung to inoperative position.

16. The combination with a machine tool having relatively movable work and tool holding members, of means for turning or boring a tapered surface on a work piece comprising a normally stationary abutment, a laterally movable tool support carried by the tool holding member, and a movement transmitting connection between the abutment and tool support comprising a pivoted bell crank and a member to which one arm of the bell crank is pivoted and having a sliding connection with the tool support.

17. A taper turning or boring attachment for machine tools comprising a normally stationary abutment adapted to be applied to a portion of the machine tool, and a unit adapted to be applied to the tool holding part of the machine tool and comprising a bracket having a laterally movable tool support, a bell crank pivotally supported by the bracket and adapted to have a connection with the abutment, and a collar supported by the tool slide for sliding movement thereon relative thereto and having pivotal connection with the other arm of the bell crank.

18. A taper turning or boring attachment for machine tools comprising a normally stationary abutment adapted to be applied to a portion of the machine tool, and a unit adapted to be applied to the tool holding part of the machine tool and comprising a bracket having a laterally movable tool slide, an adjustable screw engaging the slide, a bell crank pivotally supported by the bracket and adapted to be rocked by the abutment, and a collar surrounding the outer portion of the screw and slidingly supported thereby and having a pivotal connection with one arm of the bell crank.

19. The combination with a machine tool having relatively movable work and tool holding members, of means for turning or boring a tapered surface comprising an abutment member, a laterally movable tool support carried by the tool holding member, and a bell crank between the abutment member and the tool support and having positive movement transmitting connections with both members and serving to give the tool support a positive lateral movement when the work and tool holding members are moved relatively in either direction.

20. The combination with a machine tool having work and tool holding members, of means for turning or boring a tapered surface comprising an abutment member, a tool support mounted on the tool holding member for movement thereon at right angles to the axis of the machine, said tool support having an inner axially projecting portion adapted to support a tool and having an outer portion with a bell crank connection between it and the abutment member.

21. In combination with a machine tool having a head with a rotatable member adapted to support a work piece, a tool holding member adapted to be moved toward and from the head, a laterally projecting bracket carried by the tool holding member and having a guideway at substantially right angles to the axis of the machine, a slide movable inwardly and outwardly along said guideway and having a portion adapted to hold a tool in fixed position thereon, a normally stationary abutment member, and a bell crank connection between the slide and the abutment member.

In testimony whereof, we hereunto affix our signatures.

JULIUS L. BAYER.
JOHN J. N. VAN HAMERSVELD.